(12) United States Patent
Tanaka (10) Patent No.: US 11,226,032 B2
(45) Date of Patent: Jan. 18, 2022

(54) AIR VENT STRUCTURE OF OIL PUMP FOR AUTOMATIC TRANSMISSION, AND METHOD FOR ASSEMBLING AIR VENT STRUCTURE

(71) Applicants: JATCO Ltd, Fuji (JP); NISSAN MOTOR CO., LTD., Yokohama (JP)

(72) Inventor: Yuuki Tanaka, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 602 days.

(21) Appl. No.: 16/087,022

(22) PCT Filed: Feb. 10, 2017

(86) PCT No.: PCT/JP2017/004842
§ 371 (c)(1),
(2) Date: Sep. 20, 2018

(87) PCT Pub. No.: WO2017/163654
PCT Pub. Date: Sep. 28, 2017

(65) Prior Publication Data
US 2019/0101207 A1  Apr. 4, 2019

(30) Foreign Application Priority Data

Mar. 22, 2016  (JP) .............................. JP2016-056877

(51) Int. Cl.
*F16H 57/04* (2010.01)
*F04C 15/00* (2006.01)
(Continued)

(52) U.S. Cl.
CPC ........... *F16H 57/0443* (2013.01); *F04C 2/10* (2013.01); *F04C 15/0053* (2013.01); *F16H 57/04* (2013.01); *F16H 57/0404* (2013.01); *F16H 57/0435* (2013.01); *F16H 57/0441* (2013.01); *F16H 57/0446* (2013.01); *F16H 57/0452* (2013.01); *F04C 14/24* (2013.01);
(Continued)

(58) Field of Classification Search
CPC .. F16H 57/0443; F16H 57/04; F16H 57/0435; F16H 57/0404; F16H 57/0441; F16H 57/0446; F16H 57/0452; F04C 15/0053
See application file for complete search history.

(56) References Cited

U.S. PATENT DOCUMENTS

| | | | |
|---|---|---|---|
| 8,882,480 B2* | 11/2014 | Oomura | F16H 61/0031 417/435 |
| 8,899,266 B2* | 12/2014 | Varda | F15B 1/26 137/574 |
| 2011/0194959 A1 | 8/2011 | Oomura | |

FOREIGN PATENT DOCUMENTS

JP        2011-163428        8/2011

* cited by examiner

*Primary Examiner* — Kevin L Lee
(74) *Attorney, Agent, or Firm* — Foley & Lardner LLP (57) ABSTRACT

An automatic transmission has an oil pump driven by a travelling driving source. An air vent structure that expels air bubbles contained in automatic transmission fluid during pump operation has an air vent hole whose one end communicates with an outlet port of the oil pump and whose other end opens toward the oil pan. An air vent tube is connected to an opening end of the air vent hole. The air vent tube is extended up to a strainer lower side gap area located between a strainer and the oil pan, and a tube opening end of the air vent tube is placed in oil of the automatic transmission fluid.

9 Claims, 9 Drawing Sheets

(51) Int. Cl.
    *F04C 2/10* (2006.01)
    *F04C 14/24* (2006.01)
    *F16H 61/00* (2006.01)
(52) U.S. Cl.
    CPC .... *F04C 2230/60* (2013.01); *F04C 2240/805* (2013.01); *F04C 2240/806* (2013.01); *F04C 2270/185* (2013.01); *F16H 2061/004* (2013.01)

AIR VENT STRUCTURE OF OIL PUMP FOR AUTOMATIC TRANSMISSION, AND METHOD FOR ASSEMBLING AIR VENT STRUCTURE

CROSS-REFERENCE TO RELATED APPLICATIONS

The present application is a U.S. National Stage of International Application No. PCT/JP2017/004842 filed on Feb. 10, 2017, which claims the benefit of Japanese Patent Application No. 2016-056877, filed on Mar. 22, 2016, the entire disclosures of all of which are incorporated herein by reference.

The present invention relates to an air vent structure of an oil pump for an automatic transmission and a method for assembling the air vent structure, which vents or expels air bubbles contained in automatic transmission fluid during operation of the oil pump.

BACKGROUND ART

As the air vent structure of the oil pump for the automatic transmission, there has been known an air vent structure in which an air vent hole whose one end communicates with a discharge port and whose other end opens toward an oil pan and an air vent passage whose one end communicates with the air vent hole are provided, and an opening end of the air vent passage is placed in oil of the automatic transmission fluid (for instance, Patent Document 1)

In a conventional air vent structure, however, the air vent hole and the air vent passage are straight passages that extend in a vehicle upward-and-downward direction, and the opening end of the air vent passage is positioned at a corner position on a vehicle front side in a working fluid-filled area attached to the oil pan when viewed as a plane view, and is placed in the oil of the automatic transmission fluid. Because of this, when the vehicle is parked with an engine stopped on an inclined road whose road inclination angle is larger than a predetermined angle, the automatic transmission is also inclined along the inclination of the road, and the opening end of the air vent passage is out of an oil surface of the automatic transmission fluid, then the air vent structure in which the opening end of the air vent passage opens in the oil is not achieved. As a consequence, the following problem arises; air gets into an oil passage of the oil pump through the air vent structure, and the automatic transmission fluid in the oil pump is released (or leaks) with the lapse of time.

The present invention was made in view of the above technical problem. An object of the present invention is therefore to provide an air vent structure of the oil pump for the automatic transmission, which prevents the release (or the leak) of the automatic transmission fluid of the oil pump even if the road inclination angle is large when parking on the inclined road.

CITATION LIST

Patent Document

Patent Document 1: Japanese Unexamined Patent Application Publication No. JP2011-163428

SUMMARY OF THE INVENTION

The present invention has an oil pump driven by a travelling driving source, sucking automatic transmission fluid stored in an oil pan from an inlet port through a strainer and supplying pressurized automatic transmission fluid to a control valve unit through an outlet port.

An air vent structure, which expels air bubbles contained in automatic transmission fluid during pump operation, comprises: an air vent passage whose one end communicates with the outlet port and whose other end opens toward the oil pan.

In this air vent structure, an opening end of the air vent passage is placed in oil of the automatic transmission fluid even when parking on an inclined road.

Therefore, the opening end of the air vent passage is placed in the oil of the automatic transmission fluid even when parking on the inclined road.

As a consequence, even in a case where a road inclination angle is large when parking on the inclined road, the release (or the leak) of the automatic transmission fluid can be prevented.

EMBODIMENTS FOR CARRYING OUT THE INVENTION

In the following description, a best mode for realizing an air vent structure of an oil pump for an automatic transmission and a method for assembling the air vent structure according to the present invention will be explained on the basis of an embodiment shown in the drawings.

First, a configuration will be explained. The air vent structure of the oil pump for the automatic transmission and the method for assembling the air vent structure of the embodiment are an air vent structure of the oil pump for the automatic transmission and a method for assembling the air vent structure which are applied to a pickup truck mounting therein a diesel engine and a longitudinally mounted automatic transmission (forward 7 speeds). A configuration of the air vent structure of the oil pump for the automatic transmission of the embodiment will be separately explained by [General configuration] and [Detailed configuration of air vent structure].

[General Configuration]

Figure 1:
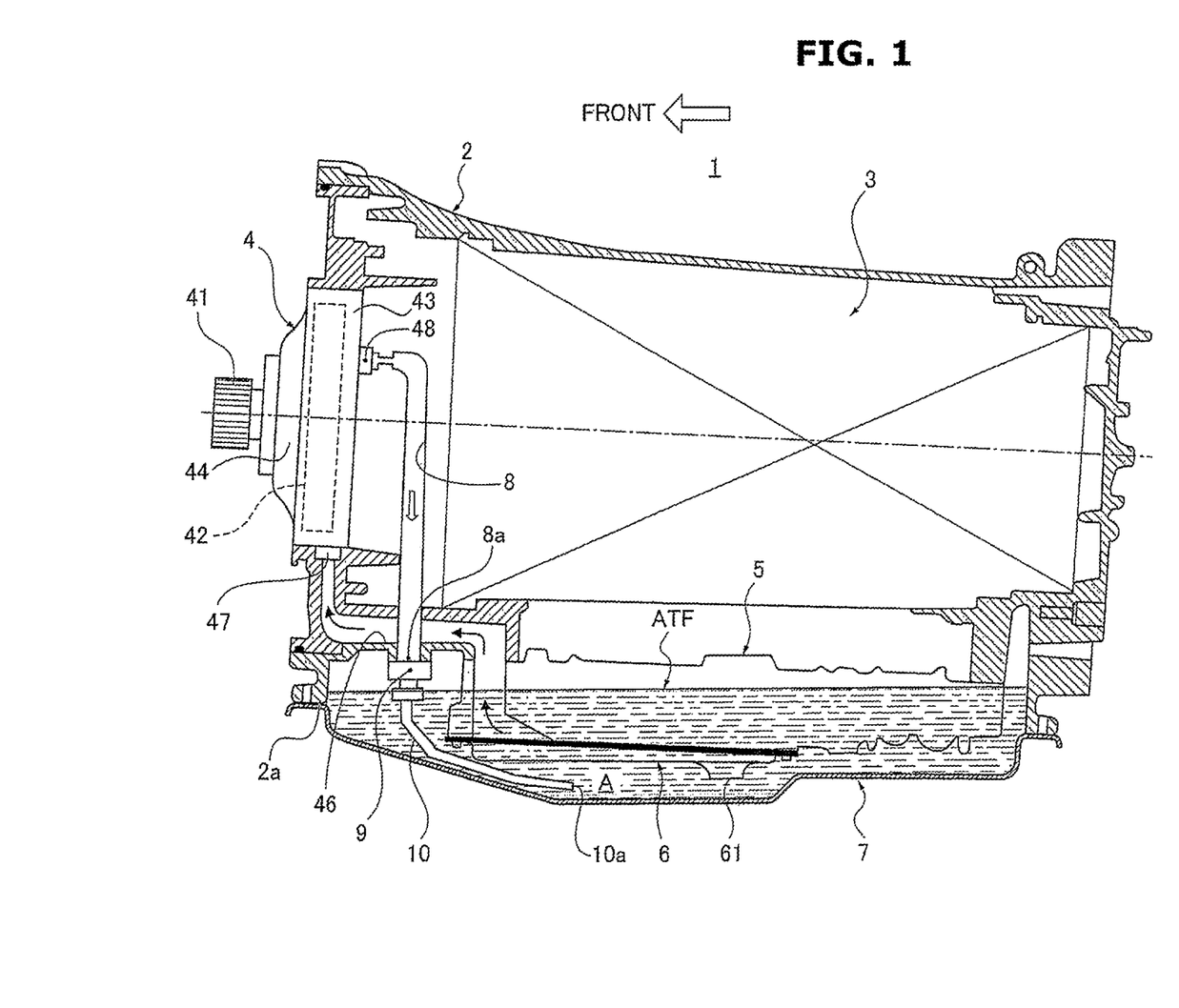
FIG. 1 is a longitudinal cross section, viewed from a side, of an automatic transmission to which an air vent structure of an oil pump according to the present embodiment is applied.
Figure 2:
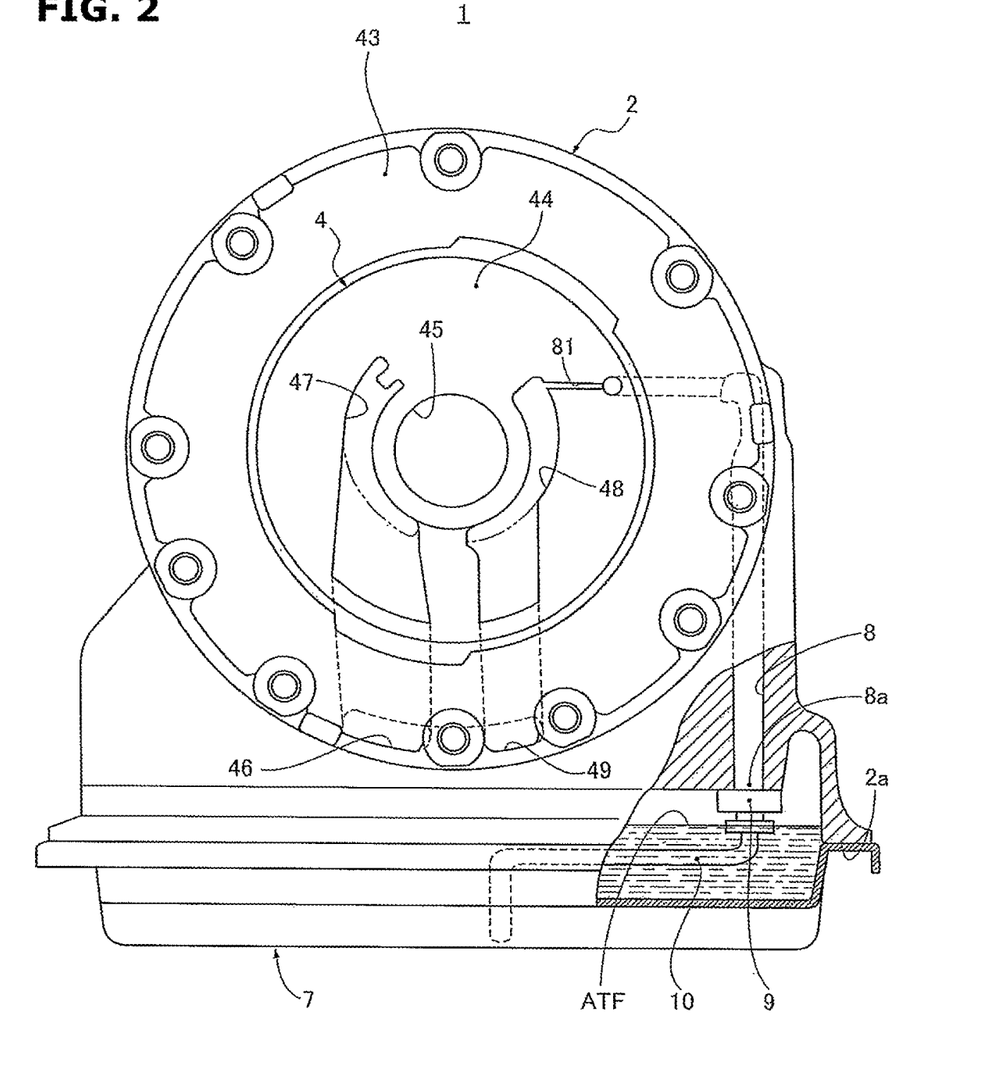
FIG. 2 is a cross section, viewed from a front, of the automatic transmission to which the air vent structure of the oil pump according to the present embodiment is applied.

FIG. 1 is a longitudinal cross section, viewed from a side, of the automatic transmission to which the air vent structure of the oil pump according to the present embodiment is applied. FIG. 2 is a cross section, viewed from a front, of the automatic transmission. A general configuration will be explained below with reference to FIGS. 1 and 2.

As shown in FIGS. 1 and 2, an automatic transmission 1 to which the air vent structure of the oil pump of the present embodiment is applied has a transmission case 2, a transmission mechanism 3, an oil pump 4, a control valve unit 5, a strainer 6 and an oil pan 7.

The transmission case 2 accommodates in a space thereof the transmission mechanism 3, and the oil pump 4 is arranged on a vehicle front side of the transmission case 2. The transmission mechanism 3 is configured by a plurality of planetary gear trains (not shown) and a plurality of shift elements (a multiple disc clutch, a multiple disc brake and a one-way clutch etc.) (not shown). In the automatic transmission 1, a hydraulically connected shift element is determined for each speed, and by supplying a shift hydraulic pressure, which is produced by the control valve unit 5 with the oil pump 4 being a hydraulic pressure source, to the shift element determined for each speed, a plurality of speeds are attained. For instance, when performing a start selecting operation of D-range or R-range upon starting a vehicle after an engine start, the shift hydraulic pressure is supplied to a start element, and a driving force from the diesel engine (a travelling driving source) is transmitted to driving wheels through a torque converter and the transmission mechanism 3, then the vehicle starts. Here, the start element is a shift element that is hydraulically connected at a 1st speed in D-range and at a 1st speed in R-range.

The oil pump 4 has an internal gear pump mechanism 42 having a rotor gear that is driven by a transmission input shaft 41 to the transmission mechanism 3 through the diesel engine and the torque converter (both not shown). The internal gear pump mechanism 42 is installed at a position in a space formed by a pump housing 43 secured to the transmission case 2 and a disk-shaped pump cover 44 fixed to the pump housing 43. The internal gear pump mechanism 42 has a shaft hole 45 which the transmission input shaft 41 to the transmission mechanism 3 penetrates. As shown in FIGS. 1 and 2, this oil pump 4 sucks automatic transmission fluid ATF stored in the oil pan 7 from an inlet port 47 through the strainer 6 and a suction passage 46 during pump operation. And, the automatic transmission fluid ATF pressurized by the internal gear pump mechanism 42 is supplied to the control valve unit 5 through an outlet port 48 and a discharge passage 49.

The control valve unit 5 is placed at and fixed to a lower posit ion of the transmission case 2. The control valve unit 5 is a unit structure having a plurality of spool valves, accumulators and orifices etc. This control valve unit 5 regulates a line pressure on the basis of a pump discharge pressure supplied from the oil pump 4, and produces the shift hydraulic pressure with the line pressure being an initial pressure, then supplies the shift hydraulic pressure to the shift element engaged through a predetermined oil passage.

The strainer 6 is fixedly connected to a lower position of the control valve unit 5 with bolts. The strainer 6 has a filter that filters out impurities contained in the automatic transmission fluid ATF. The strainer 6 has an oil suction opening 61 for sucking the automatic transmission fluid ATF stored in the oil pan 7, and the oil suction opening 61 opens downwards toward the oil pan 7.

The oil pan 7 is an oil pan that stores therein the automatic transmission fluid ATF. The oil pan 7 is fixed to a rectangular mating surface 2a that opens at a lower side of the transmission case 2 with bolts. As shown in FIGS. 1 and 2, at a stop of operation of the oil pump 4, the automatic transmission fluid ATF is stored up to such a specified level as to fully submerge the strainer 6 in the oil pan 7 except for an upper side of the control valve unit 5.

[Detailed Configuration of Air Vent Structure]

Figure 3:
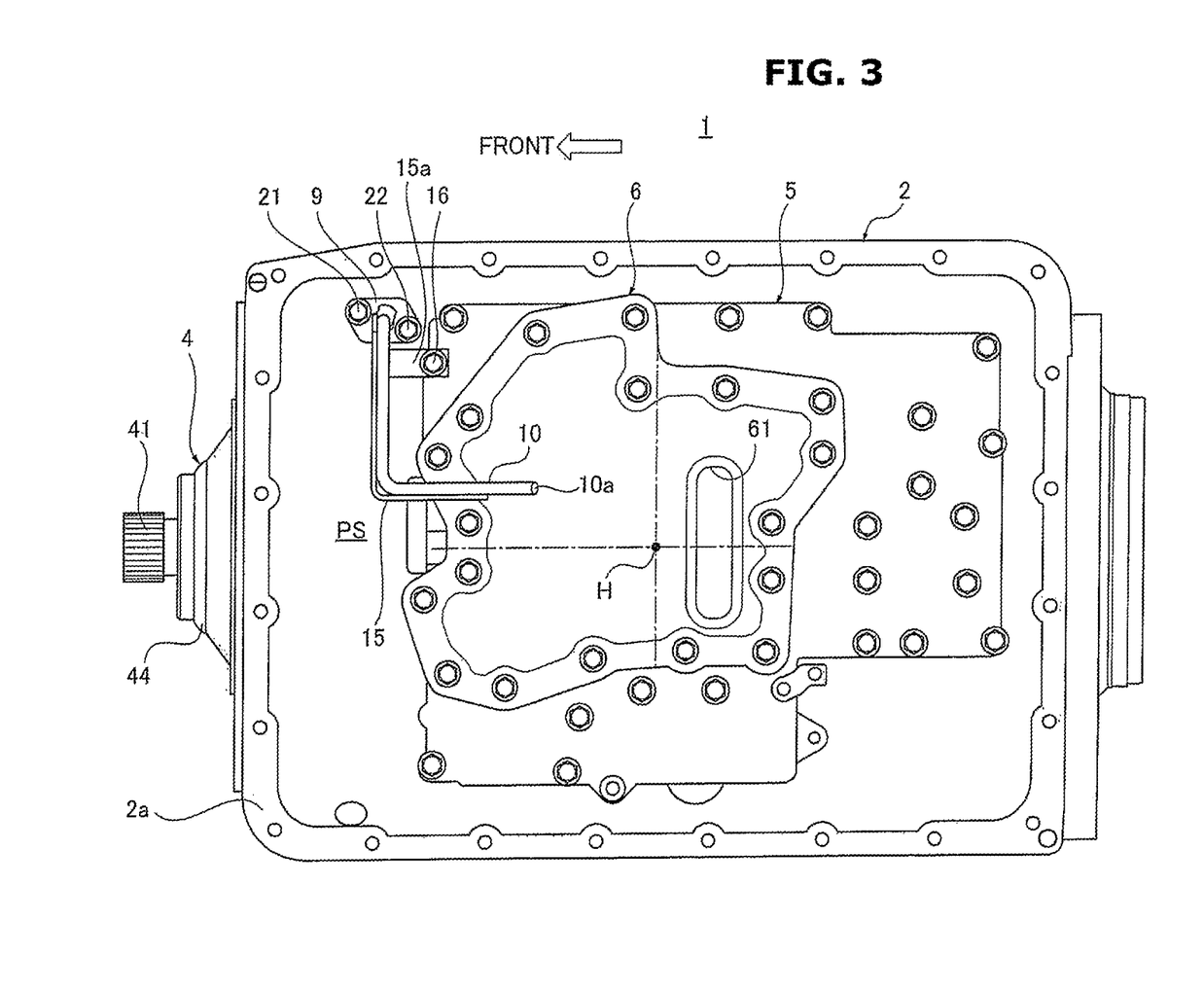
FIG. 3 is a bottom view, with an oil pan removed, of the automatic transmission to which the air vent structure of the oil pump according to the present embodiment is applied.
Figure 4:
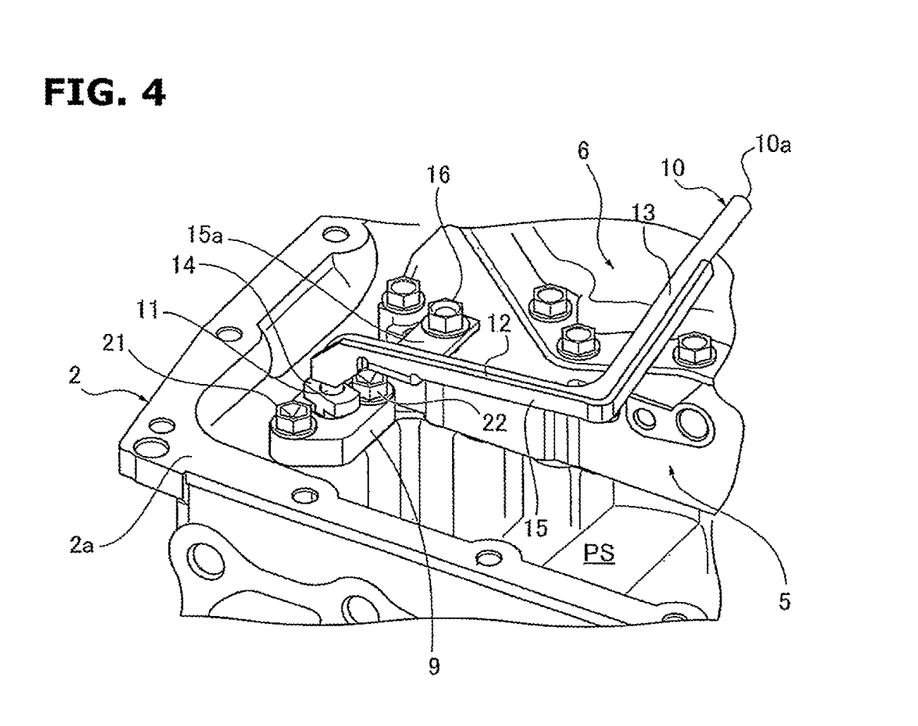
FIG. 4 is a perspective view of an essential part, with the oil pan removed, of the automatic transmission to which the air vent structure of the oil pump according to the present embodiment is applied.
Figure 5:
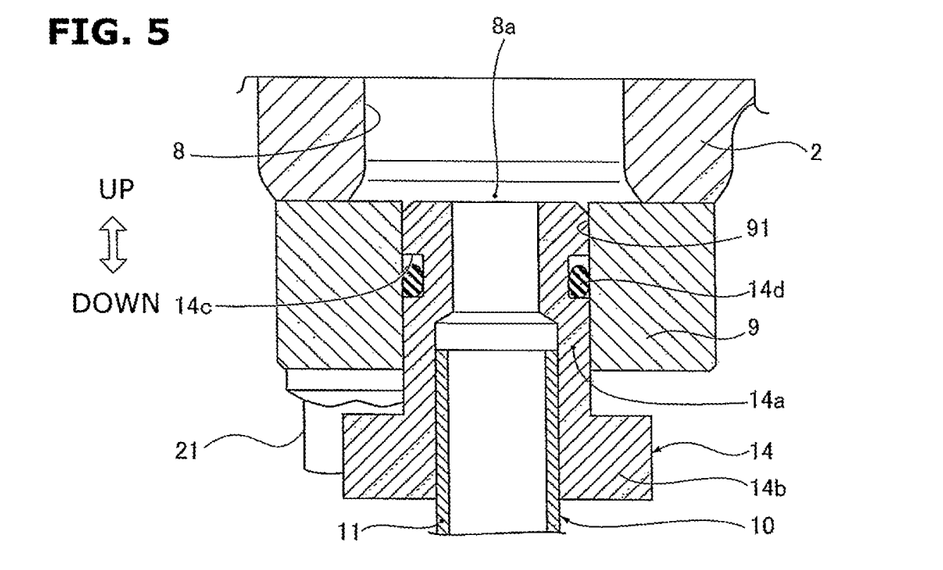
FIG. 5 is an enlarged view showing a connecting structure of an air vent tube to a plate adapter, in the automatic transmission to which the air vent structure of the oil pump according to the present embodiment is applied.

FIG. 3 is a bottom view, with the oil pan 7 removed, of the automatic transmission to which the air vent structure of the oil pump according to the present embodiment is applied. FIG. 4 is a perspective view of an essential part, with the oil pan 7 removed, of the automatic transmission. FIG. 5 is an enlarged view showing a connecting structure of an air vent tube 10 to a plate adapter 9. A Detailed configuration of the air vent structure will be explained below with reference to FIGS. 1 to 5.

As the air vent structure that vents or expels air bubbles contained in automatic transmission fluid ATF during pump operation, as shown in FIGS. 1 and 2, the air vent structure has an air vent hole 8, the plate adapter 9 and the air vent tube 10.

The air vent hole 8 is a hole that extends from a position contiguous to the outlet port 48 of the oil pump 4 in a vehicle upward-and-downward direction. One end of the air vent hole 8 communicates with the outlet port 48 of the oil pump 4 through a choke hole 81, and the other end of the air vent hole 8 opens downwards toward the oil pan 7.

Here, the choke hole 81 has a small cross-sectional area like an orifice and has a long hole length as compared with the orifice. For instance, the choke hole 81 is formed by forming a groove on a mating surface between the pump housing 43 and the pump cover 44. That is, during pump operation, the pressurized automatic transmission fluid ATF is supplied to the control valve unit 5 from the outlet port 48 of the oil pump 4 through the discharge passage 49. At this time, in order to expel the air bubbles contained in automatic transmission fluid ATF while securing the supply of the pressurized automatic transmission fluid ATF to the control valve unit 5, the choke hole 81 is provided at a position that branches off from the outlet port 48.

Further, as shown in FIG. 3, an opening end 8a of the air vent hole 8 is placed at a corner position in a pump-side space PS, which is located on a vehicle front side with respect to a center area where the strainer 6 and the control valve unit 5 are arranged, in a rectangular working fluid-filled area attached to the oil pan 7 when viewed as a plane view.

As shown in FIGS. 3 and 4, the plate adapter 9 is fixed to a position of the opening end 8a of the air vent hole 8 formed at the transmission case 2 (a case member) with two bolts 21 and 22. The plate adapter 9 is a component for insertion-connecting the air vent tube 10 to the plate adapter 9 while securing a sealing state. This plate adapter 9 has a substantially parallelogram shape having such a thickness as to secure an inserting amount of the air vent tube 10. As shown in FIG. 5, the plate adapter 9 has a tube insertion hole 91 that penetrates the middle of the plate adapter 9 and communicates with the air vent hole 8. An inner surface of the tube insertion hole 91 undergoes a polishing or smoothing process so as to gain a high surface accuracy in order to secure the sealing state between the tube insertion hole 91 and the air vent tube 10.

The air vent tube 10 is connected to the opening end 8a of the air vent hole 8 through the plate adapter 9, and an air vent passage communicating with the air vent hole 8 is formed by the tube inner surface. As shown in FIG. 1, this air vent tube 10 is extended up to a strainer lower side gap area A sandwiched (located) between the strainer 6 and the oil pan 7 from a connecting position with the air vent hole 8. Then, a tube opening end 10a of the air vent tube 10 is placed in oil of the automatic transmission fluid ATF at a strainer lower side position.

The connecting position of the air vent tube 10 with the air vent hole 8 is placed, as shown in FIG. 3, at a corner position on the vehicle front side and on an outlet port 48 side in the rectangular working fluid-filled area attached to the oil pan. 7 when viewed as a plane view. On the other hand, as shown in FIG. 3, the tube opening end 10a of the air vent tube 10 is placed at the strainer lower side position in the center area of the rectangular working fluid-filled area attached to the oil pan 7 when viewed as a plane view. The air vent tube 10 connecting two separate positions in the rectangular working fluid-filled area in this way is configured by a first tube section 11, a second tube section 12, a third tube section 13, a connector 14 and a reinforcing plate 15, as shown in FIG. 4.

The first tube section 11 is connected to the air vent hole 8 through the plate adapter 9, and is extended in the vehicle downward direction. The second tube section 12 is bent from the first tube section 11, passes through the pump-side space PS and is extended in a pump shaft orthogonal direction. The third tube section 13 is bent from the second tube section 12 and is extended in a pump shaft direction along a bottom surface of the oil pan 7. An end surface of the third tube section 13 is the tube opening end 10a of the air vent tube 10.

As shown in FIGS. 4 and 5, the connector 14 is provided at an end position of the first tube section 11. The connector 14 has a tubular section 14a inserted into the tube insertion hole 91 of the plate adapter 9 and a brim or shell section 14b formed at an outer circumference of the tubular section 14a and having an outside diameter that is larger than the tube insertion hole 91. As shown in FIG. 5, a ring groove 14c is formed at the tubular section 14a, and an O-ring (a seal ring) 14d is fitted in this ring groove 14c.

As shown in FIG. 4, the reinforcing plate 15 is set from a part of the first tube section 11 along the second tube section 12 and a some midpoint of the third tube section 13 of the air vent tube 10. This reinforcing plate 15 has a shape that encloses a part of a cross-section of the air vent tube 10, which provides or delivers a reinforcing performance. Further, a tube fixing bracket 15a for fixing the air vent tube 10 at an enclosing portion of the second tube section 12 is formed integrally with the reinforcing plate 15. A tightening bolt 16 that secures the air vent tube 10 to the transmission case 2 together with the control valve unit 5 is provided at a bolt hole 15b (see FIG. 13) formed at the tube fixing bracket 15a.

Next, working or function will be explained. Working or function of the embodiment will be separately explained by [Arrangement of opening end in oil when parking on inclined road], [Other features of air vent structure], [Method for assembling air vent structure] and [Other features of method for assembling air vent structure].

[Arrangement of Opening End in Oil When Parking on Inclined Road]

For instance, assume that the air vent structure of the oil pump for the automatic transmission is configured only by the air vent hole whose one end communicates with the outlet port and the opening end of the air vent hole is released in the transmission case.

In this case, when the engine is stopped, air gets into an oil passage of the oil pump from the air vent hole. The automatic transmission fluid in the oil pump is then released (or leaks) with the lapse of time, and consequently, oil film (oil slick) of a pump rotor of the oil pump runs out (or disappears). When starting the engine after a lapse of long time from the engine stop, although the engine is operated, it takes time to finish expelling the air getting into the oil passage of the oil pump with the oil film of the pump rotor, which has disappeared, being gradually formed. Therefore, even if the engine is started, a desired automatic transmission fluid is not discharged from the oil pump until the oil pump finishes expelling the air having got into the oil passage from start of pump operation. Thus, even if a start selecting operation is performed after the engine start with the intention of starting the vehicle, the vehicle start by the engine driving force is not possible until the start element is hydraulically connected. Especially in a case of the diesel engine, its rotation speed is low as compared with a gasoline engine, and it takes long time to finish expelling the air getting into the oil passage of the oil pump from start of the pump operation by the engine start.

Therefore, as a comparative example, the air vent structure, in which as measures to prevent the release (or leak) of the automatic transmission fluid from the air vent hole at the engine stop, the air vent passage is added and the opening end of the air vent passage is placed in the oil of the automatic transmission fluid, is taken. In a case of this comparative example, when parking on a flat road, since a state in which the opening end of the air vent passage is placed in the oil of the automatic transmission fluid is held, it is possible to prevent the release (or leak) of the automatic transmission fluid at the engine stop.

Figure 6:
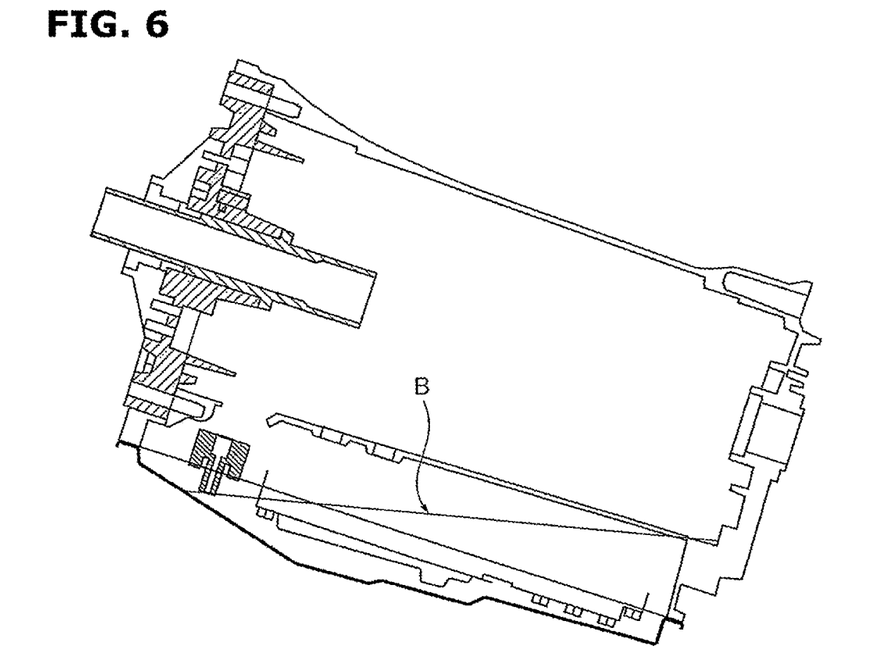
FIG. 6 is an explanatory drawing, viewed from a side, of an air vent structure of the oil pump for the automatic transmission of a comparative example, showing and explaining an inclination limit of arrangement of an opening end of an air vent passage in oil of automatic transmission fluid.
Figure 7:
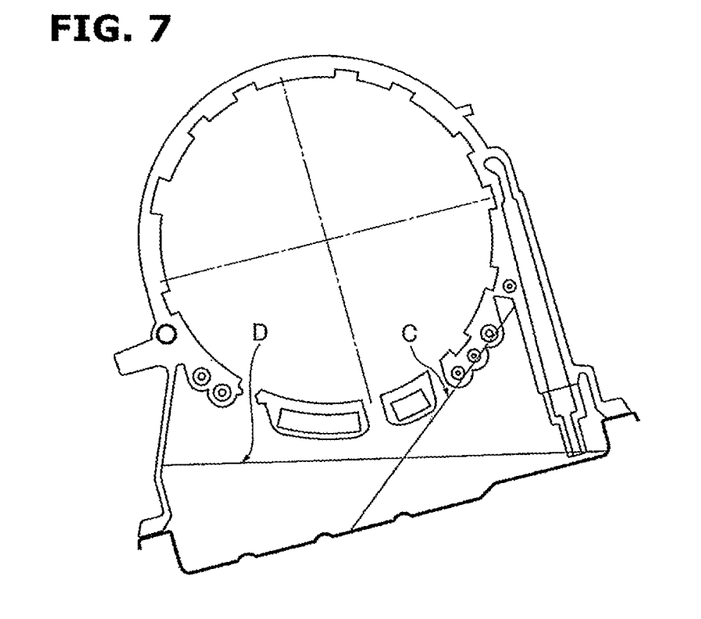
FIG. 7 is an explanatory drawing, viewed from a front, of the air vent structure of the oil pump for the automatic transmission of the comparative example, showing and explaining right and left inclination limits of arrangement of the opening end of the air vent passage in oil of the automatic transmission fluid.

However, in the case of the comparative example, when parking on an inclined road (a hill), as shown in FIG. 6, the vehicle front side of the transmission case inclines upward and a vehicle rear side of the transmission case inclines downward. Due to this inclination of the transmission case, an oil surface of the automatic transmission fluid on the vehicle front side sinks down (falls) and an oil surface of the automatic transmission fluid on the vehicle rear side rises. For this reason, as a result of consideration of effectiveness of the measures, in a case of an oil surface B of the inclined road (the hill), there are limitations on a hill inclination rate at which an arrangement of the opening end of the air vent passage in the oil of the automatic transmission fluid can be secured. On an inclined road whose hill inclination rate exceeds this limit of the hill inclination rate, the opening end of the air vent passage is out of the oil of the automatic transmission fluid, and therefore is released (placed) in the transmission case. Further, in a case of an oil surface C of a right inclined road of right and left inclined roads, as shown in FIG. 7, the arrangement of the opening end of the air vent passage in the oil of the automatic transmission fluid can be secured until the inclination is 80% or more. However, in a case of an oil surface D of the left inclined road of the right and left inclined roads, there are limitations on a left inclination rate. As shown in FIG. 7, on the left inclined road whose left inclination rate exceeds this limit of the left inclination rate, the opening end of the air vent passage is out of the oil of the automatic transmission fluid, and therefore is released (placed) in the transmission case.

That is, when checking or confirming the inclined road (the hill) in the world where the vehicle could be parked, in the case of the comparative example, an inclined road (a hill) that cannot cope with the hill inclination rate exists. Especially when the start element is not hydraulically connected upon start on the hill, not only the vehicle cannot start, but also the vehicle rolls back along the hill unless a brake operation is performed. Hence, measures to cope with the road inclination are required in the global market.

For these measures, in the air vent structure of the present embodiment, the air vent tube 10 communicating with the air vent hole 8 is extended up to the strainer lower side gap area A sandwiched (located) between the strainer 6 and the oil pan 7 from the connecting position with the air vent hole 8. Then, the tube opening end 10a of the air vent tube 10 is placed in oil of the automatic transmission fluid ATF at the strainer lower side position.

That is, the strainer 6 having the oil suction opening 61 is arranged at a middle lower position in the oil pan 7 so that the oil suction opening 61 is positioned in the oil of the automatic transmission fluid even during the pump operation of a case where the oil surface of the automatic transmission fluid ATF greatly varies. By focusing attention on this point, as an element of the air vent structure, the air vent tube 10 having a high degree of flexibility in routing by bending is selected, and the tube opening end 10a of this air vent tube 10 is placed in oil of the automatic transmission fluid ATF at the strainer lower side position. Therefore, even when parking on the inclined road (the hill) having an imaginable largest road inclination angle as an inclined road where the vehicle might be parked, the arrangement of the tube opening end 10a of the air vent tube 10 in the oil of automatic transmission fluid ATF is held, then the air does not get into the oil passage of the oil pump 4 through the air vent structure.

A verification result as to whether the air vent structure of the present embodiment can meet the inclination in the global market is the following.

Figure 8:
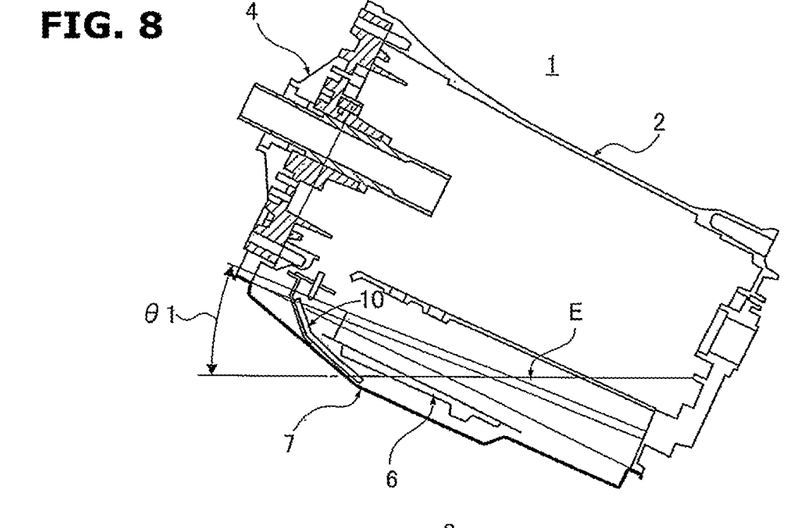
FIG. 8 is an explanatory drawing, viewed from a side, of the air vent structure of the oil pump for the automatic transmission of the present embodiment, showing and explaining an inclination limit of arrangement of an opening end of an air vent tube in oil of automatic transmission fluid.

In the case of the parking on the inclined road (the hill), as shown in FIG. 8, when a hill inclination angle of the inclined road is $\theta 1$ that corresponds to a maximum value of the inclination angle of the inclined road in the world where the vehicle might be parked, an oil surface of the inclined road is an oil surface E. And, a state in which the tube opening end 10a of the air vent tube 10 is placed in the oil of the automatic transmission fluid ATF is held.

Figure 9:
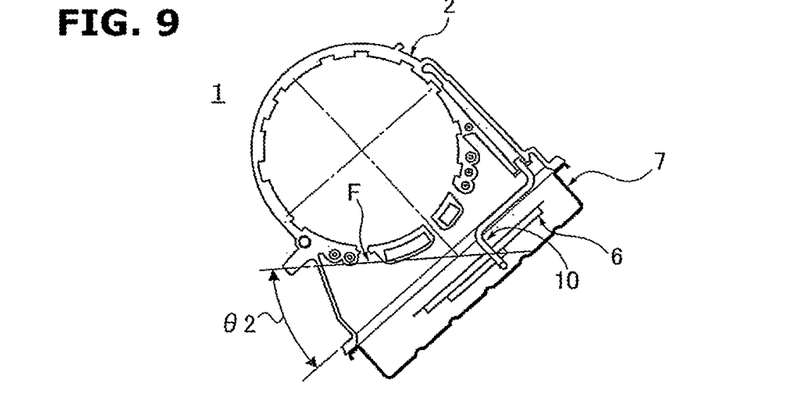
FIG. 9 is an explanatory drawing, viewed from a front, of the air vent structure of the oil pump for the automatic transmission of the present embodiment, showing and explaining a right inclination limit of arrangement of the opening end of the air vent tube in oil of the automatic transmission fluid.

In the case of the parking on the right inclined road, as shown in FIG. 9, when a right inclination angle $\theta 2$ of the right inclined road is 80%, an oil surface of the right inclined road is an oil surface F. And, a state in which the tube opening end 10a of the air vent tube 10 is placed in the oil of the automatic transmission fluid ATF is held.

Figure 10:
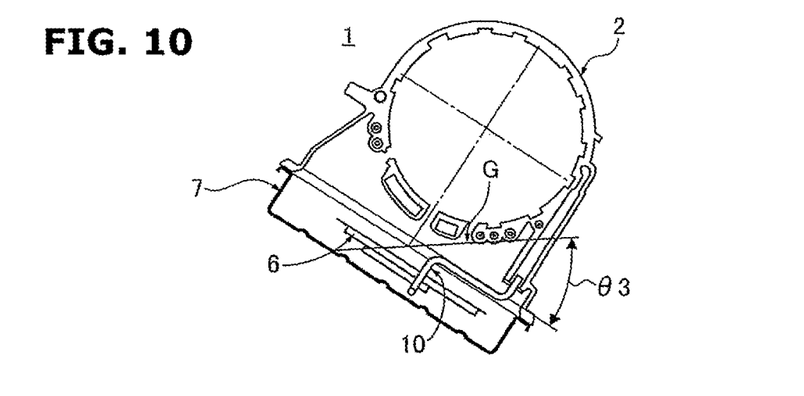
FIG. 10 is an explanatory drawing, viewed from a front, of the air vent structure of the oil pump for the automatic transmission of the present embodiment, showing and explaining a left inclination limit of arrangement of the opening end of the air vent tube in oil of the automatic transmission fluid.

In the case of the parking on the left inclined road, as shown in FIG. 10, when a left inclination angle $\theta 3$ of the left inclined road is 80%, an oil surface of the left inclined road is an oil surface G. And, a state in which the tube opening end 10a of the air vent tube 10 is placed in the oil of the automatic transmission fluid ATF is held.

As described above, it was verified that even when parking on the inclined road (the hill) having the imaginable largest road inclination angle as an inclined road where the vehicle might be parked, by the measures to cope with the road inclination in the global market, the release (or the leak) of the automatic transmission fluid ATF of the oil pump 4 can be prevented. Here, to set the hill inclination angle $\theta 1$ and the right inclination angle $\theta 2$ etc., which are limit angles of the arrangement of the tube opening end 10a of the air vent tube 10 in the oil of the automatic transmission fluid ATF, to an even larger angle, it can be adjusted by bringing the tube opening end 10a of the air vent tube 10 closer to a center position (a point H in FIG. 3) in the rectangular working fluid-filled area attached to the oil pan 7 when viewed as a plane view.

[Other Features of Air Vent Structure]

In the configuration of the embodiment, the plate adapter 9 to which the air vent tube 10 is insertion-connected while securing the sealing state with the tube insertion hole 91 is fixed to the transmission case 2 where the air vent hole 8 is formed.

For instance, regarding an inner surface working or process of the tube insertion hole, if the working is carried out to the transmission case 2, it is necessary to add a tool for carrying out the inner surface working of the tube insertion hole to a case working facility. Further, if there is no room to change the tool in the case working facility in a working time, a work for changing the tool has to be added during the working of the transmission case 2.

In contrast to this, when the plate adapter 9 is added as a separate component, the transmission case 2 does not undergo the working, but the inner surface working is carried out to the tube insertion hole 91 of the plate adapter 9. This therefore facilitates the working of the transmission case 2.

In the configuration of the embodiment, the air vent tube 10 is configured by the first tube section 11, the second tube section 12 and the third tube section 13. The first tube section 11 is connected to the air vent hole 8, and is extended in the vehicle downward direction. The second tube section 12 is bent from the first tube section 11, passes through the pump-side space PS and is extended in the pump shaft orthogonal direction. The third tube section 13 is bent from the second tube section 12 and is extended in the pump shaft direction along the bottom surface of the oil pan 7. And, the end surface of the third tube section 13 is the tube opening end 10a of the air vent tube 10.

That is, the opening end 8a of the air vent hole 8 is placed at the corner position in the pump-side space PS, which is located away from the center area where the strainer 6 and the control valve unit 5 are arranged, in the working fluid-filled area attached to the oil pan 7 when viewed as a plane view. Therefore, as shown in FIG. 3, the connecting position of the air vent tube 10 with the air vent hole 8 and the strainer lower side position at which the tube opening end 10a of the air vent tube 10 is placed are separate positions from each other in the rectangular working fluid-filled area. Here, for connecting the two positions by the air vent tube 10, there are the following three patterns 1 to 3, a pattern 1: connecting the two positions in a straight line by the air vent tube 10, a pattern 2: connecting the two positions by bending the air vent tube 10 from the pump shaft direction to the pump shaft orthogonal direction, and a pattern 3 (the present embodiment): connecting the two positions by bending the air vent tube 10 from the pump shaft orthogonal direction to the pump shaft direction. In the cases of the patterns 1 and 2, such a complicated bending route as to avoid interference with each of the control valve unit 5 and the strainer 6 from the connecting position of the air vent tube 10 with the air vent hole 8 is required.

In contrast to this, in the case of the pattern 3 (the present embodiment), the second tube section 12 can be a straight line that passes through the pump-side space PS with the pump-side space PS being effectively utilized. In this manner, although the air vent tube 10 is shaped into a simple bending shape, the air vent tube 10 can be extended up to the strainer lower side position while avoiding interference with each of the control valve unit 5 and the strainer 6.

In the configuration of the embodiment, the first tube section 11 is provided with the connector 14 having the brim section 14b whose outside diameter is larger than the tube insertion hole 91.

That is, when fixing the air vent tube 10 to the plate adapter 9, an adapter side end portion of the air vent tube 10 to which the O-ring 14d is fitted is inserted into the tube insertion hole 91 of the plate adapter 9. At this time, if the brim section 14b is not provided at the connector 14, there is a risk of excessively inserting the air vent tube 10 to a position at which sealing performance is impaired. In contrast to this, by providing the brim section 14b at the connector 14, the excessive insertion of the air vent tube 10 is avoided.

In the configuration of the embodiment, the reinforcing plate 15 is provided along the air vent tube 10. Further, the tube fixing bracket 15a for fixing the air vent tube 10 is formed integrally with the reinforcing plate 15.

For instance, if a plate component to attain the reinforcing performance of the air vent tube 10 and a bracket component to attain a fixing performance of the air vent tube 10 are individually provided, at least two components are necessary.

In contrast to this, by forming the tube fixing bracket 15a integrally with the reinforcing plate 15, the reinforcing performance of the air vent tube 10 and the fixing performance of the air vent tube 10 can be attained while reducing a parts count.

[Method for Assembling Air Vent Structure]

First, a method for assembling the air vent structure is a method of assembly when fixing the air vent tube 10 of the air vent structure of the embodiment to the transmission case 2 through the plate adapter 9.

Here, the air vent structure, as an object of the method for assembling the air vent structure, which vents or expels the air bubbles contained in automatic transmission fluid ATF during pump operation, has the air vent hole 8 communicating with the outlet port 48, the plate adapter 9 and the air vent tube 10. Then, the tube opening end 10a of the air vent tube 10 is placed in the oil of the automatic transmission fluid ATF at the strainer lower side position.

As the method for assembling the air vent structure in the embodiment, the assembly of the air vent structure is included in one assembling process of a control valve assembly in an assembly line of an automatic transmission unit, and the air vent structure is assembled in this control valve assembly assembling process. The control valve assembly assembling process includes a fixing procedure of the plate adapter 9 to the case 2 (FIG. 11), a control valve assembly assembling procedure (FIG. 12) and a connecting and fixing procedure of the air vent tube 10 (FIG. 13). Each procedure of the control valve assembly assembling process, to which the method for assembling the air vent structure is applied, will be explained below with reference to FIGS. 11 to 13.

<Fixing Procedure of Plate Adapter to Case (FIG. 11)>

Figure 11:
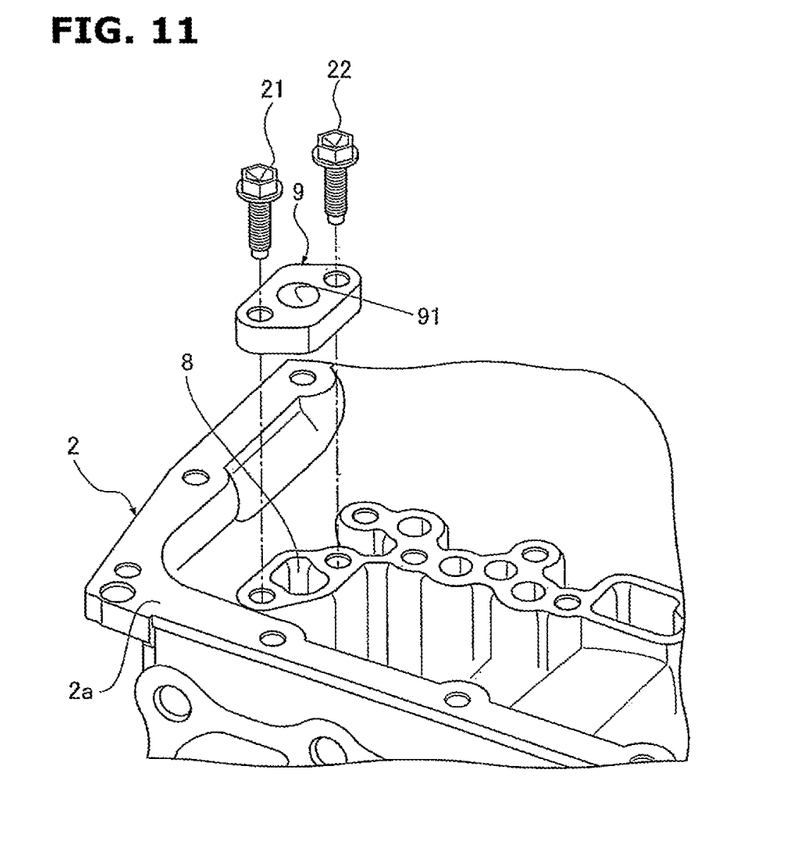
FIG. 11 is a perspective view showing a fixing procedure of the plate adapter to a case in an assembly method of the air vent structure of the oil pump according to the present embodiment.

The fixing procedure of the plate adapter 9 to the case 2 is a procedure under which, before the control valve assembly assembling procedure (FIG. 12), as shown in FIG. 11, the plate adapter 9 is secured to a position, which communicates with the outlet port 48, of the air vent hole 8 of the transmission case 2.

That is, before fixing the control valve unit 5 and the strainer 6 to the transmission case 2, i.e. in a state in which no factor that interferes with the fixing work of the plate adapter 9 exists, the plate adapter 9 is fixed to the transmission case 2 with the bolts 21 and 22. Here, the tube insertion hole 91 previously undergoing the working or process of a seal surface with the air vent tube 10 is formed at the plate adapter 9.

<Control Valve Assembly Assembling Procedure (FIG. 12)>

Figure 12:
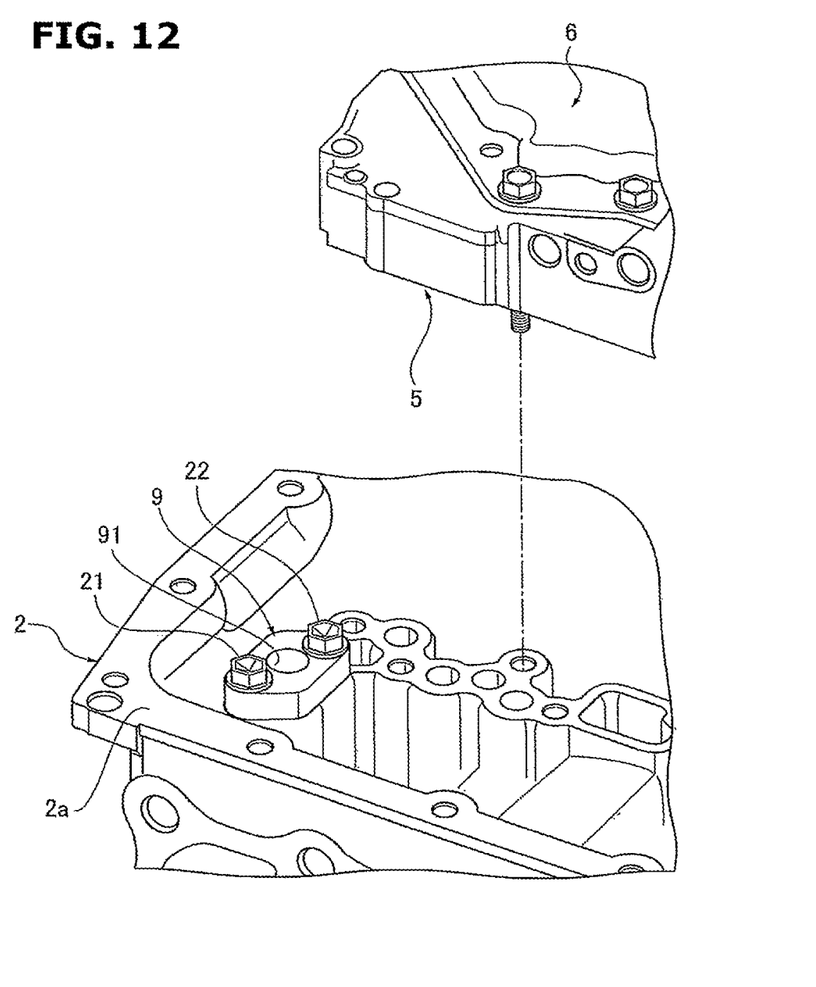
FIG. 12 is a perspective view showing an assembling procedure of a control valve assembly in the assembly method of the air vent structure of the oil pump according to the present embodiment.
Figure 13:
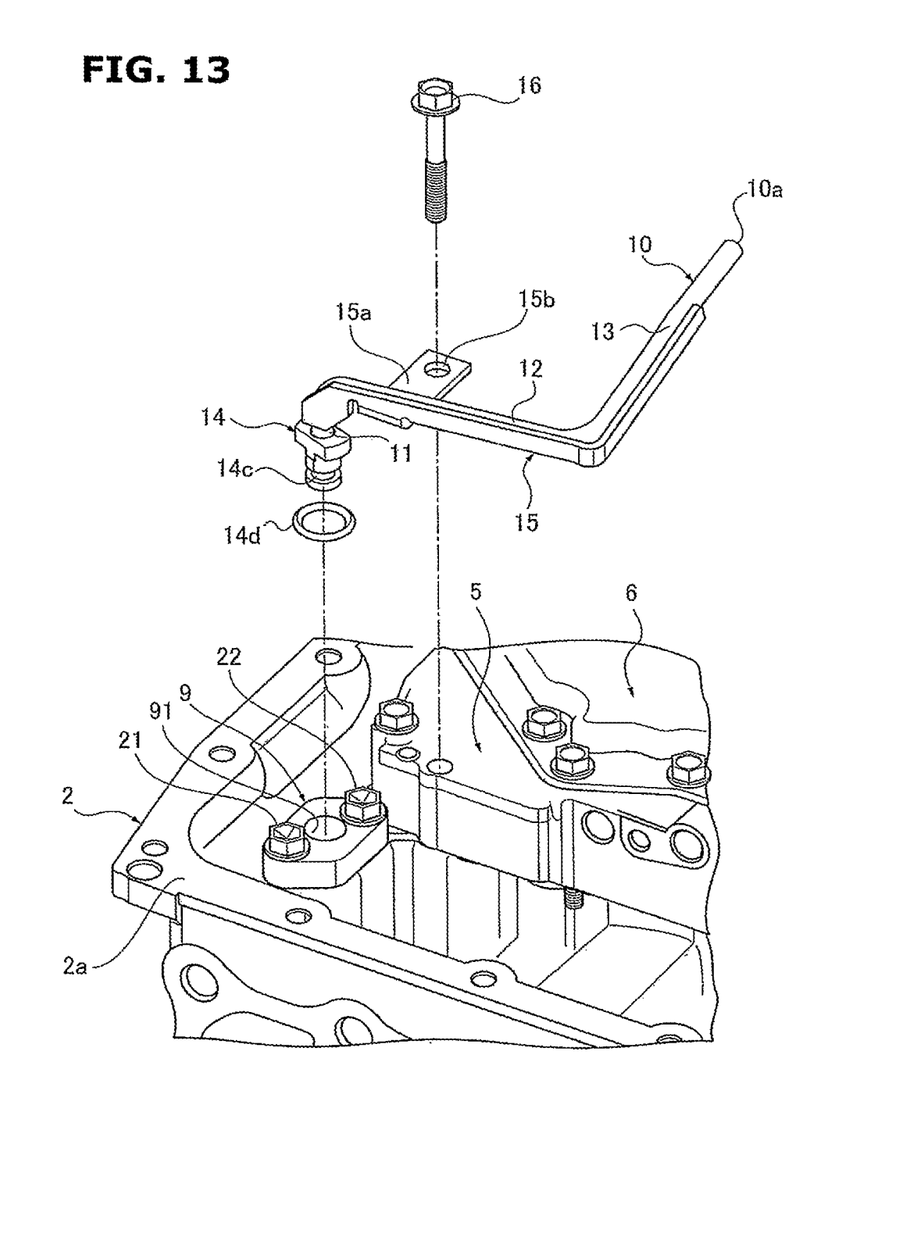
FIG. 13 is a perspective view showing a connecting and fixing procedure of the air vent tube in the assembly method of the air vent structure of the oil pump according to the present embodiment.

The control valve assembly assembling procedure is a procedure under which, as shown in FIG. 12, the control valve unit 5 is fixed to the transmission case 2 together with the strainer 6, and this is a procedure up to a state immediately before completing the assembly.

That is, in the control valve assembly assembling procedure, a control valve assembly 5, 6 in which the strainer 6 is previously secured to the control valve unit 5 with bolts is prepared. Then, the control valve assembly 5, 6 is arranged or mounted at a fixing position of the transmission case 2, and a bolt tightening work of a plurality of bolts that are inserted and screwed into the respective bolt holes provided at outer peripheral positions of the control valve unit 5 is carried out. At this time, the bolt tightening work for one bolt and its bolt hole that opens at the control valve unit 5 is not carried out yet. In this way, in a state in which only the plate adapter 9 is fixed to the transmission case 2 before connecting and fixing the air vent tube 10, the control valve assembly 5, 6 is fixed to the transmission case 2 with the plurality of bolts except the one bolt.

<Connecting and Fixing Procedure of Air Vent Tube (FIG. 13)>

The connecting and fixing procedure of air vent tube is a procedure under which, as shown in FIG. 13, fixing of the air vent tube 10 is completed then the control valve assembly assembling process is completed at the same time. This connecting and fixing procedure of the air vent tube 10 includes an attaching procedure of the air vent tube 10 to the plate adapter 9 and a fixing procedure of the air vent tube 10 to the transmission case 2.

In the air vent tube attaching procedure, the O-ring 14*d* is previously fitted to the connector 14 of the adapter side end portion of the air vent tube 10. Then, when attaching the air vent tube 10 to the plate adapter 9, the connector 14, to which the O-ring 14*d* is fitted, of the air vent tube 10 is inserted into the tube insertion hole 91 of the plate adapter 9.

In the air vent tube fixing procedure, the tube fixing bracket 15*a* having the bolt hole 15*b* is previously provided at the air vent tube 10. Then, when fixing the air vent tube 10 attached to the plate adapter 9, the air vent tube 10 is fixed to the transmission case 2 together with the control valve unit 5 at a position of the bolt hole 15*b* with the tightening bolt 16 inserted into the bolt hole 15*b*. The control valve assembly assembling process is completed at the same time of completion of this tightening-fixing by the tightening bolt 16.

[Assembly of Air Vent Structure]

As an assembling method when fixing the air vent tube to the transmission case, the following (a) and (b) etc. are conceivable.

(a) After completing the control valve assembly assembling process, an air vent tube assembling process is added.

(b) The assembly of the air vent tube is completed without using the plate adapter at the same time of the assembly of the control valve assembly.

However, in the case of (a), although there is no problem with working of the transmission case, a problem with assembly of the automatic transmission unit occurs. That is, if the air vent tube assembling process is added as a different process from the control valve assembly assembling process, the automatic transmission unit assembly line has to be considerably modified, and a large investment is required. Here, since the tube opening end of the air vent tube is placed at the strainer lower side position, it is not possible to insert the air vent tube assembling process before the control valve assembly assembling process.

In the case of (b), although there is no problem with the assembly of the automatic transmission unit, a problem with the working of the transmission case occurs. That is, in the working of the transmission case, it is necessary to add the tool for carrying out the inner surface working of the tube insertion hole to the case working facility and to modify the case working facility so as to be able to change the tool. However, because of a concurrent production with other case working, there is no room to change the tool in the case working facility in a working time. That is, the working of the transmission case, which meets specifications of no-tool-change as a precondition, is not possible.

In contrast to this, in the case of the method for assembling the air vent structure of the embodiment, when fixing the air vent tube 10 to the transmission case 2 through the plate adapter 9, before assembling the control valve assembly 5, 6, the plate adapter 9 is fixed to the transmission case 2. Then, within a bound of the control valve assembly assembling process after assembling the control valve assembly 5, 6, the air vent tube 10 is fixed to the plate adapter 9.

That is, the assembly of the air vent structure is incorporated as a part of the one assembling process of the control valve assembly in the automatic transmission unit assembly line. In other words, the plate adapter 9 and the air vent tube 10 are assembled without adding a new process other than the control valve assembly assembling process in the automatic transmission unit assembly line.

As a consequence, regarding (a), by fixing the air vent tube 10 to the plate adapter 9 within the bound of the control valve assembly assembling process after assembling the control valve assembly 5, 6, it is possible to cope with (a). Therefore, there is no need to add the assembling process of the air vent tube 10 as a different process from the control valve assembly assembling process, and an assembling performance is improved.

Regarding (b), by adding the plate adapter 9 between the transmission case 2 and the air vent tube 10, it is possible to cope with (b). Therefore, by carrying out the inner surface working of the tube insertion hole 91 of the plate adapter 9 without carrying out the working of the transmission case 2, the working of the transmission case 2 is facilitated.

[Other Features of Method for Assembling Air Vent Structure]

In the method shown in the above embodiment, when fixing the air vent tube 10 to the plate adapter 9, the adapter side end portion of the air vent tube 10 to which the O-ring 14*d* is fitted is inserted into the tube insertion hole 91 of the plate adapter 9.

That is, when fixing the air vent tube 10 to the plate adapter 9, only an insertion work of the adapter side end portion of the air vent tube 10 into the tube insertion hole 91 of the plate adapter 9 is required without requiring a bolt-tightening-work that takes time.

Therefore, when fixing the air vent tube 10 to the plate adapter 9, the air vent tube 10 can be fixed to the plate adapter 9 easily and quickly.

In the method shown in the above embodiment, when fixing the air vent tube 10 to the transmission case 2, the air vent tube 10 is fixed to the transmission case 2 together with the control valve unit 5 at the position of the bolt hole 15*b* with the tightening bolt 16 inserted into the bolt hole 15*b*.

That is, by using the tightening bolt 16, fixing of the air vent tube 10 to the transmission case 2 is completed at the same time of completion of the control valve assembly assembling process.

Therefore, when fixing the air vent tube 10 to the transmission case 2 in the control valve assembly assembling process, it is possible to reduce man-hour and shorten a fixing and assembling time.

Next, effects will be explained.

The air vent structure of the oil pump for the automatic transmission and the method for assembling the air vent structure according to the embodiment obtain the following effects.

(1) An air vent structure of an oil pump 4 for an automatic transmission, which expels air bubbles contained in automatic transmission fluid ATF during pump operation, the oil pump 4 driven by a travelling driving source, sucking the automatic transmission fluid ATF stored in an oil pan 7 from an inlet port 47 through a strainer 6 and supplying pressurized automatic transmission fluid ATF to a control valve unit 5 through an outlet port 48, the air vent structure comprises: an air vent passage whose one end communicates with the outlet port 48 and whose other end opens toward the oil pan 7, and an opening end of the air vent passage is placed in oil of the automatic transmission fluid ATF even when parking on an inclined road.

Therefore, even in a case where the road inclination angle is large when parking on the inclined road, the release (or the leak) of the automatic transmission fluid can be prevented.

(2) An air vent hole 8 that opens toward the oil pan 7 is provided, an air vent tube 10 whose tube inner surface forms the air vent passage communicating with the air vent hole 8 is connected to an opening end 8a of the air vent hole 8, the air vent tube 10 is extended up to a strainer lower side gap area A located between the strainer 6 and the oil pan 7 from a connecting position with the air vent hole 8, and a tube opening end 10a of the air vent tube 10 is placed in the oil of the automatic transmission fluid. ATF at a strainer lower side position.

Therefore, in addition to the effect of (1), the tube opening end 10a of the air vent tube 10 can be placed in the oil of the automatic transmission fluid ATF at the strainer lower side position using the air vent tube 10 having a high degree of flexibility in routing by bending.

(3) A plate adapter 9 to which the air vent tube 10 is insertion-connected while securing a sealing state between the air vent tube 10 and a tube insertion hole 91 of the plate adapter 9 is fixed to a case member 2 (the transmission case 2) where the air vent hole 8 is formed.

Therefore, in addition to the effect of (2), when insertion-connecting the air vent tube 10 while securing the sealing state, by carrying out the inner surface working of the tube insertion hole 91 of the plate adapter 9 that is an added component, the working of the case member 2 (the transmission case 2) is facilitated.

(4) The opening end 8a of the air vent hole 8 is placed at a corner position in a pump-side space PS, which is located away from a center area where the strainer 6 and the control valve unit 5 are arranged, in a working fluid-filled area attached to the oil pan 7 when viewed as a plane view, and the air vent tube 10 is configured by a first tube section 11 which is connected to the air vent hole 8 and is extended in a vehicle downward direction, a second tube section 12 which is bent from the first tube section 11, passes through the pump-side space PS and is extended in a pump shaft orthogonal direction and a third tube section 13 which is bent from the second tube section 12 and is extended in a pump shaft direction along a bottom surface of the oil pan 7 and whose end surface is the tube opening end 10a of the air vent tube 10.

Therefore, in addition to the effect of (2) or (3), although the air vent tube 10 is shaped into a simple bending shape, the air vent tube 10 can be extended up to the strainer lower side position, and the tube opening end 10a of the air vent tube 10 can be placed in the oil of the automatic transmission fluid ATF.

(5) The first tube section 11 is provided with a connector 14 having a brim section 14b whose outside diameter is larger than the tube insertion hole 91 of the plate adapter 9.

Therefore, in addition to the effect of (4), since the connector 14 has the brim section 14b, it is possible to prevent the air vent tube 10 from being inserted excessively.

(6) A reinforcing plate 15 is provided along the air vent tube 10, and a tube fixing bracket 15a that fixes the air vent tube 10 is formed integrally with the reinforcing plate 15.

Therefore, in addition to the effect of (4) or (5), the reinforcing performance of the air vent tube 10 and the fixing performance of the air vent tube 10 can be attained while reducing a parts count.

(7) A method for assembling an air vent structure of an oil pump 4 for an automatic transmission, which expels air bubbles contained in automatic transmission fluid ATF during pump operation, the oil pump 4 driven by a travelling driving source, sucking the automatic transmission fluid ATF stored in an oil pan 7 from an inlet port 47 through a strainer 6 and supplying pressurized automatic transmission fluid ATF to a control valve unit 5 through an outlet port 48, the air vent structure having an air vent hole 8 communicating with the outlet port 48, a plate adapter 9 fixed to a case member 2 (the transmission case 2) where the air vent hole 8 is formed and an air vent tube 10 connected to the plate adapter 9, and a tube opening end 10a of the air vent tube 10 being placed in oil of the automatic transmission fluid ATF at a strainer lower side position, the method comprises: a control valve assembly assembling process in which a control valve assembly 5, 6 in which the strainer 6 is secured to the control valve unit 5 is assembled to the case member 2 (the transmission case 2); and a plate adapter securing process in which when fixing the air vent tube (10) to the case member 2 (the transmission case 2) through the plate adapter 9, before the control valve assembly assembling process, the plate adapter 9 is secured to the case member 2, and during the control valve assembly assembling process, the air vent tube 10 is connected to the plate adapter 9.

Therefore, when fixing the air vent tube 10 to the case member 2 (the transmission case 2) through the plate adapter 9, a work of the transmission case 2 can be facilitated, and an assembling performance of the air vent tube 10 can be improved.

(8) A tube insertion hole 91 that undergoes a work of a seal surface with the air vent tube 10 is previously formed at the plate adapter 9, and a seal ring 14d is previously fitted to an end portion, on a plate adapter side, of the air vent tube 10, and when connecting the air vent tube 10 to the plate adapter (9), the end portion, on the plate adapter side, of the air vent tube 10, to which the seal ring 14d is fitted, is inserted into the tube insertion hole 91 of the plate adapter 9.

Therefore, in addition to the effect of (7), when fixing the air vent tube 10 to the plate adapter 9, the air vent tube 10 can be fixed to the plate adapter 9 easily and quickly.

(9) A tube fixing bracket 15a having a bolt hole 15b is provided at the air vent tube 10, and when fixing the air vent tube 10, the air vent tube 10 is fixed to the case member 2 (the transmission case 2) together with the control valve unit 5 at a position of the bolt hole 15b with a tightening bolt 16.

Therefore, in addition to the effect of (7) or (8), when fixing the air vent tube 10 to the transmission case 2 in the control valve assembly assembling process, it is possible to reduce man-hour and shorten a fixing and assembling time.

Although the air vent structure of the oil pump for the automatic transmission and the method for assembling the air vent structure according to the present invention have been explained on the basis of the above embodiment, a specified configuration is not limited to the above embodiment. The configuration includes all design modifications and equivalents belonging to the technical scope of the present invention.

The above embodiment shows the example of the air vent structure in which the plate adapter 9 to which the air vent tube 10 is insertion-connected while securing the sealing state with the tube insertion hole 91 is fixed to the transmission case 2 where the air vent hole 8 is formed. However, as the air vent structure, the air vent tube could be directly insertion-connected to the transmission case where the air vent hole is formed without using the plate adapter.

Further, it is conceivable that a work for securing a sealing performance with the transmission case 2 is carried out only to a surface, on a transmission case 2 side, of the plate adapter 9. In this case, in order to prevent the plate adapter 9 from being fixed inside out, the transmission case 2 is provided with a convex portion or a protrusion that protrudes toward the plate adapter 9. Then, when trying to fix the plate adapter 9 to the transmission case 2 inside out, this protrusion interferes with the plate adapter 9, then this does not allow a bolt-fixing of the plate adapter 9 to the transmission case 2.

The above embodiment shows the example of the air vent structure in which the air vent tube 10 is configured by the first tube section 11, the second tube section 12 and the third tube section 13. However, the air vent tube could be an air vent tube that has a bending shape other than the bending shape shown in the embodiment in order to meet the arrangement of the connecting position of the air vent tube to the air vent hole and the position of the tube opening end of the air vent tube, or meet the position and shape of the control valve assembly.

The above embodiment shows the example of the air vent structure in which as the air vent tube 10, the first tube section 11 is provided with the connector 14 having the brim section 14*b*, and the reinforcing plate 15 is provided along the shape of the air vent tube 10. However, the air vent tube could be an air vent tube having no connector and no reinforcing plate. Further, each shape of the connector and the reinforcing plate could be different from that of the above embodiment.

The above embodiment shows the example of the air vent structure in which the tube fixing bracket 15*a* for fixing the air vent tube 10 is formed integrally with the reinforcing plate 15. However, the tube fixing bracket 15*a* and the reinforcing plate 15 could be separately provided.

In the method for assembling the air vent structure of the above embodiment, after the control valve assembly assembling procedure, the air vent tube 10 is inserted into the plate adapter 9, and the air vent tube 10 is fixed to the transmission case 2 at the same time of completion of the assembly of the control valve assembly 5, 6. However, the air vent tube could be fixed to the transmission case after the control valve assembly is assembled and before the completion of this assembly of the control valve assembly or after the completion of this assembly of the control valve assembly. In short, within a bound of the control valve assembly assembling process after assembling the control valve assembly, the air vent tube is fixed to the plate adapter.

The above embodiment shows the example in which the air vent structure of the oil pump for the automatic transmission and the method for assembling the air vent structure are applied to the pickup truck mounting therein the diesel engine and the longitudinally mounted automatic transmission (forward 7 speeds). However, the air vent structure of the oil pump for the automatic transmission and the method for assembling the air vent structure can be applied to a gasoline engine and a hybrid vehicle other than the diesel engine vehicle. Further, also regarding the automatic transmission, the present invention can be applied to not only the longitudinally mounted multi-range transmission but also a transversely mounted multi-range transmission and a continuously variable transmission. In sum, as long as a vehicle mounts therein the oil pump, which is driven by the travelling driving source, for the automatic transmission, the present invention can be applied to the vehicle.

The invention claimed is:

1. An air vent structure of an oil pump for an automatic transmission, which expels air bubbles contained in automatic transmission fluid during pump operation, the oil pump driven by a travelling driving source, sucking the automatic transmission fluid stored in an oil pan from an inlet port through a strainer and supplying pressurized automatic transmission fluid to a control valve unit through an outlet port, the air vent structure comprising:

an air vent passage having one end that communicates with the outlet port and another end that opens toward the oil pan and that is placed in oil of the automatic transmission fluid even when the automatic transmission is arranged at an inclination angle.

2. The air vent structure of the oil pump for the automatic transmission as claimed in claim 1, wherein the air vent passage includes:

an air vent hole that opens toward the oil pan; and an air vent tube whose tube inner surface forms a portion of the air vent passage communicating with the air vent hole and which is connected to an opening end of the air vent hole, wherein the air vent tube is extended up to a strainer lower side gap area located between the strainer and the oil pan from a connecting position with the air vent hole, and a tube opening end of the air vent tube is placed in the oil of the automatic transmission fluid at a strainer lower side position.

3. The air vent structure of the oil pump for the automatic transmission as claimed in claim 2, wherein:

a plate adapter to which the air vent tube is insertion-connected while securing a sealing state between the air vent tube and a tube insertion hole of the plate adapter is fixed to a case member where the air vent hole is formed.

4. The air vent structure of the oil pump for the automatic transmission as claimed in claim 2, wherein:

the opening end of the air vent hole is placed at a corner position in a pump-side space, which is located away from a center area where the strainer and the control valve unit are arranged, in a working fluid-filled area attached to the oil pan when viewed as a plane view, and the air vent tube is configured by a first tube section which is connected to the air vent hole and is extended in a vehicle downward direction, a second tube section which is bent from the first tube section, passes through the pump-side space and is extended in a pump shaft orthogonal direction and a third tube section which is bent from the second tube section and is extended in a pump shaft direction along a bottom surface of the oil pan and whose end surface is the tube opening end of the air vent tube.

5. The air vent structure of the oil pump for the automatic transmission as claimed in claim 4, wherein:

the first tube section is provided with a connector having a brim section whose outside diameter is larger than the tube insertion hole of the plate adapter.

6. The air vent structure of the oil pump for the automatic transmission as claimed in claim 4, wherein:

a reinforcing plate is provided along the air vent tube, and a tube fixing bracket that fixes the air vent tube is formed integrally with the reinforcing plate.

7. A method for assembling an air vent structure of an oil pump for an automatic transmission, which expels air bubbles contained in automatic transmission fluid during pump operation, the oil pump driven by a travelling driving source, sucking the automatic transmission fluid stored in an oil pan from an inlet port through a strainer and supplying pressurized automatic transmission fluid to a control valve unit through an outlet port, the air vent structure having an air vent hole communicating with the outlet port, a plate adapter fixed to a case member where the air vent hole is formed and an air vent tube connected to the plate adapter, and a tube opening end of the air vent tube being placed in oil of the automatic transmission fluid at a strainer lower side position, the method comprising:

a control valve assembly assembling process in which a control valve assembly in which the strainer is secured to the control valve unit is assembled to the case member; and a plate adapter securing process in which when fixing the air vent tube to the case member through the plate adapter, before the control valve assembly assembling process, the plate adapter is secured to the case member, and wherein during the control valve assembly assembling process, the air vent tube is connected to the plate adapter.

8. The method for assembling the air vent structure of the oil pump for the automatic transmission as claimed in claim 7, wherein:

a tube insertion hole that undergoes a work of a seal surface with the air vent tube is previously formed at the plate adapter, and a seal ring is previously fitted to an end portion, on a plate adapter side, of the air vent tube, and when connecting the air vent tube to the plate adapter, the end portion, on the plate adapter side, of the air vent tube, to which the seal ring is fitted, is inserted into the tube insertion hole of the plate adapter.

9. The method for assembling the air vent structure of the oil pump for the automatic transmission as claimed in claim 7, wherein:

a tube fixing bracket having a bolt hole is provided at the air vent tube, and when fixing the air vent tube, the air vent tube is fixed to the case member together with the control valve unit at a position of the bolt hole with a tightening bolt.

* * * * *